April 1, 1930.  W. T. SPARROW  1,752,544
PIN OR BOLT RETAINER FOR BRAKE RIGGING
Filed Sept. 30, 1926
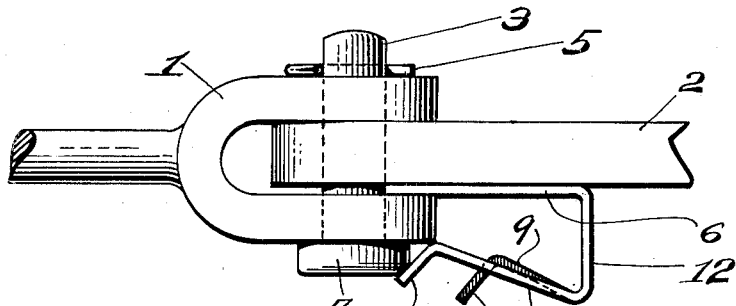
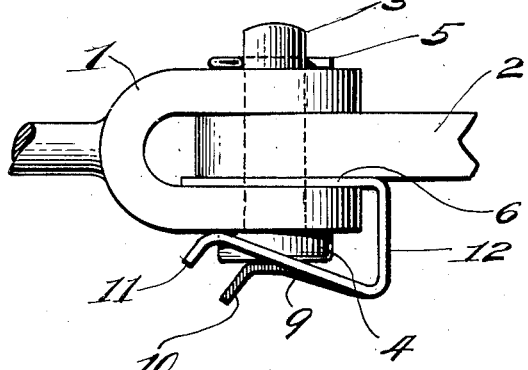
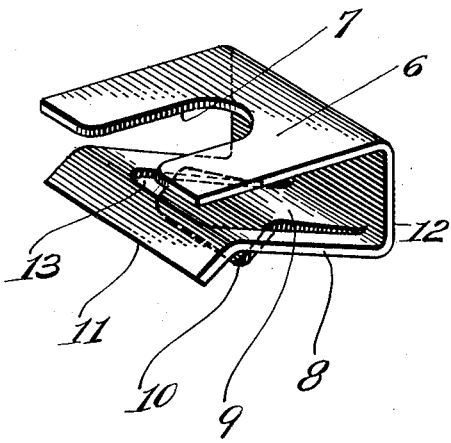
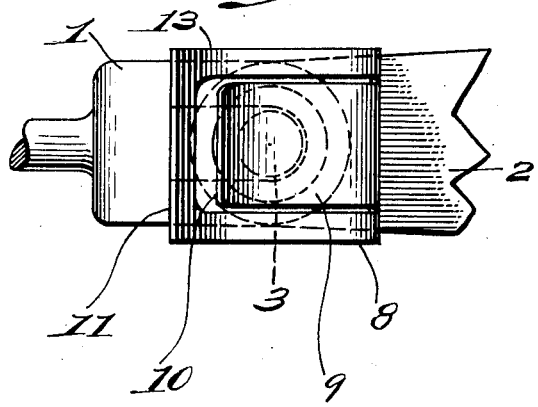
INVENTOR:
William T. Sparrow,
BY
ATTORNEYS.

Patented Apr. 1, 1930

1,752,544

UNITED STATES PATENT OFFICE

WILLIAM T. SPARROW, OF HAMPTON, VIRGINIA, ASSIGNOR OF ONE-THIRD TO
E. HAYWARD FAIRBANKS, OF MERCHANTVILLE, NEW JERSEY

PIN OR BOLT RETAINER FOR BRAKE RIGGING

Application filed September 30, 1926. Serial No. 138,722.

My invention relates to a novel construction of a pin retainer, which is not only especially applicable to pins for brake mechanisms, but equally applicable to machinery which is subjected to constant vibration, my novel device serving to prevent accidental removal of the brake pin or the like and at the same time being readily removed or replaced when occasion requires, which operation can be performed indefinitely without affecting the efficiency of the device.

As is well known air brake mechanisms consist of a series of levers connected by rods, so as to transmit the power from the air brake cylinder to the wheels, said rods having jaws which engage the ends of the brake levers and are connected thereto by pins common to the jaws and levers. Various expedients have heretofore been employed such as nuts, lock washers and spring cotters, but as is well known laborers frequently do not apply such devices at all or fail to separate the legs of the spring cotters, which results in the latter becoming lost due to the jolting of the train and in case the cotters or the like become dislodged the pin will fall out. Under these circumstances not only the brake mechanisms fail to operate but the rods are liable to fall on the road bed and be damaged and if the pin connecting the brake beam support falls out or becomes lost, it will allow one end of said brake beam to fall upon the road bed and the other end to project upwardly and derail the truck, which results in loss of control of the train, wrecks and loss of lives, as well as other damage.

In view of the foregoing conditions the Interstate Commerce Commission requires that eighty-five per cent (85%) of the cars in a train shall have their brake mechanisms operative before the train may move in interstate traffic.

My novel device is applicable to the American Railroad Association standard brake jaws and levers and can be used with equal facility upon old as well as new equipment, and the device being fool-proof, it can not be improperly applied. By my device I have not only provided a novel and efficient means for preventing the accidental displacement of a brake pin, but as a result of my novel construction, pins can be made shorter than the conventional pins now in vogue, which results in a considerable saving due to the fact that there are millions of such pins used annually.

To the above ends my invention, stated in its broadest terms, relates to a novel pin or bolt retainer especially adapted for brake rigging, and other machinery which is subject to constant vibration, and has more especial relation to a pin or bolt retainer calculated to exert a constant, positive, and continous pressure upon one end of a pin or bolt, so as to retain the latter at all times in assembled position or to force the same inwardly in a direction to prevent loss of the pin or bolt, said retainer when in position being self locking and requiring no forming or bending in application.

The leading object of the present invention resides in the provision of a pin or bolt retainer of the character stated, which is of simple and efficient structure, which may be inexpensively manufactured, and which is provided with means as a lip whereby the retainer may be readily guided to place, and automatically locked when in assembled position.

Other and further objects of the present invention reside in the provision of novel features of construction, arrangement and combination of parts for attaining the results sought by the leading object.

The invention consists of the novel construction hereinafter described and finally claimed.

The nature, characteristic features and scope of the invention will be more fully understood from the following description taken in connection with the accompanying drawings forming part hereof.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1, represents a perspective view of a pin or bolt retainer embodying my invention.

Figure 2, represents a view in elevation illustrating a rod and brake lever and their complemental pin or bolt showing the manner of assembling my novel pin or bolt retainer.

Figure 3, represents a view in elevation illustrating my novel pin or bolt retainer in assembled position.

Figure 4, represents a view of the underside of Figure 3.

Similar numerals of reference indicate corresponding parts.

Referring first to Figures 1 to 4 inclusive, 1 designates the terminal or bifurcated portion of a brake rod or the like, which has pivotal connection to an end of an arm or lever 2, the part 1 being bifurcated to receive the part 2 and all of said parts being apertured in alignment to receive the pin or bolt 3. The pin or bolt 3 is provided with a head 4 and if desired a cotter pin 5 may be employed, as is common practice in the art. As is well known, and as experience has shown, due to various causes considerable loss is entailed due to the accidental displacement of the retaining pins or bolts 3. The pin or bolt retainer of the invention as shown in Fig. 1 comprises a substantially U-shaped member of relatively thin metal having an inner plate 6 or member slotted or bifurcated at 7, and an outer plate or member 8 having struck out therefrom a resilient tongue 9 provided with a terminal lip 10 deflected at an obtuse angle therefrom, said plate 8 terminating in an outwardly extending tongue 11, also deflected at an obtuse angle. The plates 6 and 8 are resiliently connected together by the member 12 and are normally slightly converged so that said plates may be sprung apart when being applied to the head 4 of the pin 3. In assembling the parts, the plate 6 is inserted between one face of lever 2 and the inner face of the bifurcated part 1, so that the bifurcated part 7 fits around or engages the stem of the pin 3. At the same time, by pushing the retainer toward the left of Figure 2, the lip 11 rides over the head 4 of the pin 3 until the tongue 9 abuts against the outer face of said head. During this movement the contiguous wall of the slotted part 13 of the plate 8 engages around the head 4 of bolt 3, as is clearly seen in Figure 3.

It will be further apparent that the wall of the slotted part 13 of the plate 8 engages around the head 4 of bolt 3 at the same time that the tongue 9 of the plate 8 abuts against and exerts pressure upon the outer surface of head 4. The obtuse angled lip 10 of the tongue 9 during this movement obviously assists in positioning the parts with respect to the head 4. From the above construction and arrangement of parts, it is apparent that the pin 3 is interlocked against longitudinal displacement by the tongue 9, and the retainer is effectively locked in position by contact of the head 4 with the contiguous wall of the slotted part 13 and that the device as a whole is effectively centered by the provision of the bifurcated portion 7 in the plate 6. It will be apparent that in case the cotter pin 5 becomes dislodged or drops out the pin 3 will be effectively secured in position.

In the embodiment of my invention, it is seen that any longitudinal movement or displacement of the coupling or connecting pins or bolts is entirely eliminated by the pressure on the ends thereof and any movement of the retainer out of position is prevented by the engagement between the locking flange or edge with the side of the head of the pins or bolts.

The embodiment of my invention can be readily produced from thin sheet metal, by simple stamping, punching or pressing operations, as is evident.

The terminal members 10, 11 and 20 in the various embodiments of my invention extend at an obtuse angle to the portion from which they are deflected as is evident.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:—

A pin retainer, comprising two members resiliently connected and converging towards each other, the top one of said members being bifurcated and the lower of said members having an obtuse angled terminal flange deflected downwardly from said top member and adapted to engage the face of the pin carrying member to lock said retainer in position, and a resilient tongue formed in said lower member and also having an obtuse angled terminal flange deflected downwardly below the plane of said lower member, both of said flanges being deflected outwardly in substantial parallelism, and a wall of said lower member from which said tongue is formed being adapted to contact with the head of a pin to lock the retainer in position and the inner wall of said tongue being adapted to contact with the end of said head to prevent longitudinal displacement thereof.

WILLIAM T. SPARROW.